Aug. 6, 1929.  E. HOWE  1,723,239
THERMOSTAT APPARATUS FOR WATER HEATERS
Filed Oct. 14, 1925  2 Sheets-Sheet 1
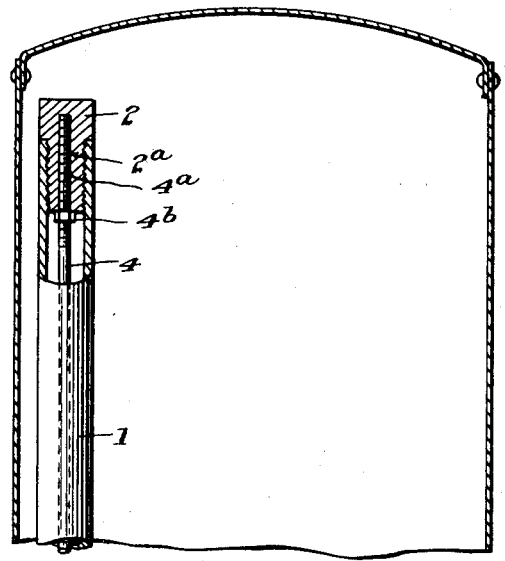
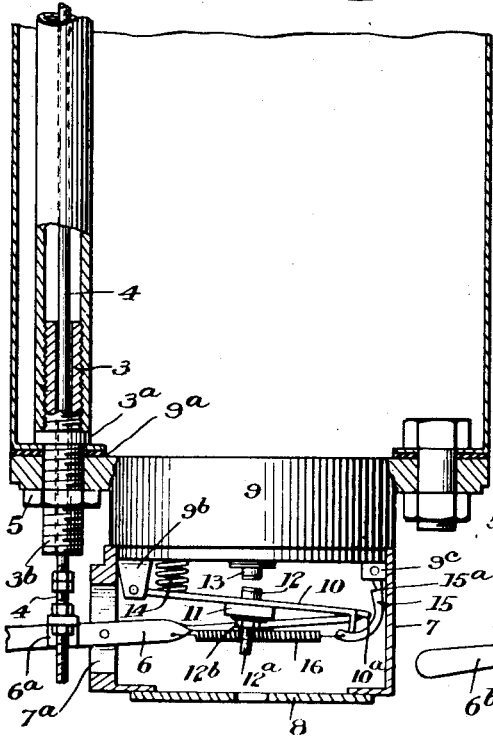
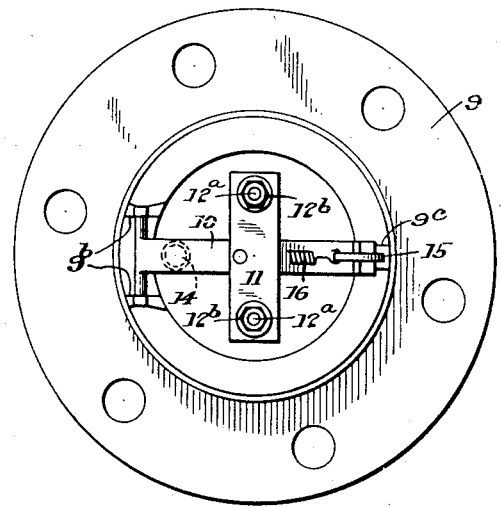
Fig. 3
Fig. 2
Fig. 1
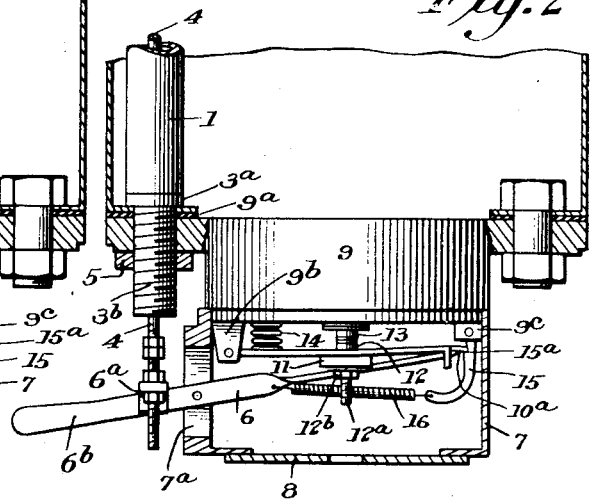
INVENTOR:
Emil Howe
BY
A. B. Bowman
ATTORNEY Aug. 6, 1929. E. HOWE 1,723,239
THERMOSTAT APPARATUS FOR WATER HEATERS
Filed Oct. 14, 1925 2 Sheets-Sheet 2

INVENTOR:
Emil Howe,
BY
A. B. Bowman
ATTORNEY

Patented Aug. 6, 1929.

1,723,239

UNITED STATES PATENT OFFICE.

EMIL HOWE, OF SAN GABRIEL, CALIFORNIA.

THERMOSTAT APPARATUS FOR WATER HEATERS.

Application filed October 14, 1925. Serial No. 62,362.

My invention relates to thermostat apparatus for controlling water heaters, and the objects of my invention are:

First, to provide a simple, effective and novelly constructed thermostat for water heater regulation. Second, to provide a thermostat which is very effective and positive in its action. Third, to provide a thermostatic apparatus with electrical switch control in connection therewith, which is simple and effective. Fourth, to provide a novel thermostat combined with electrical switch apparatus which is quick acting, positive, and which will not readily deteriorate or get out of order. Fifth, to provide a novel, quick acting electrical switch apparatus for controlling electrical water heaters. Sixth, to provide an apparatus of this class which may be manually controlled independently of the thermostatic action. Seventh, to provide a novel thermostatic apparatus for water heaters as a whole and eighth, to provide an apparatus of this class which is very simple and economical of construction, durable, easy to install, easy to operate, positive in its action and which will not readily deteriorate or get out of order.

Figure 4:
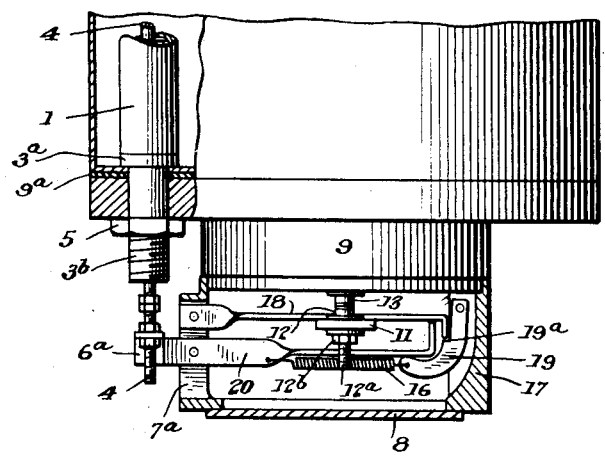
Figure 5:
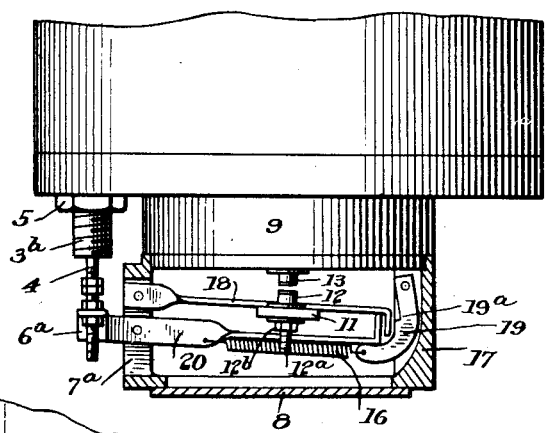
Figure 6:
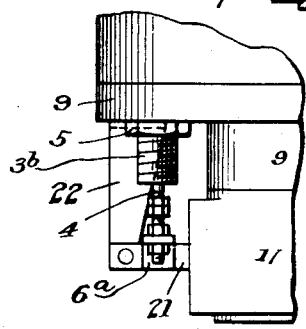

With these and other objects in view as will appear hereinafter, my invention consists of certain novel features of construction, combination and arrangement of parts and portions as will be hereinafter described in detail, and particularly set forth in the appended claims, reference being had to the accompanying drawings and to the characters of reference thereon, which form a part of this application in which:

Figure 1 is a side elevational view of the thermostat apparatus shown in relation with a water heater tank showing some of the parts and portions broken away and in section to facilitate the illustration, and showing the thermostatic apparatus in position when the heater is not in operation. Fig. 2 is a similar fragmentary view of the lower end of the same showing the apparatus with the electrical contact in engagement and the heater in operation. Fig. 3 is a bottom view of the same with the casing of the thermostatic control switch removed. Fig. 4 is a view similar to that of Fig. 2 in a slightly modified form. Fig. 5 is a similar view of the same showing the electrical contacts open, and Fig. 6 is similar fragmentary view showing the switch apparatus in another modified form.

Similar characters of reference refer to similar parts and portions throughout the several views of the drawings.

The thermostat tube 1, plug 2, plug 3, rod 4, lock nut 5, lever 6, casing 7, cap 8, base 9, contact supporting lever 10, insulation member 11, movable contacts 12, stationary contacts 13, spring 14, latch member 15, and spring 16 constitute the principal parts and portions of my thermostat apparatus in its preferred form.

The thermostatic tube 1 is composed of aluminum and is a relatively thin tube internally threaded at its opposite ends and it is preferred to make it nearly the length of the water tank in which it is mounted. It is provided in its one end with a plug 2, which is externally threaded so that it will fit tightly in the end and close the one end of said tube. This plug is provided with a central threaded hole $2^a$ in which is screwed the threaded end $4^a$ of the rod 4. This rod is held tightly in place by means of a lock nut $4^b$. In the opposite end of the tube is plug 3, which is also externally threaded so that the one end is mounted in the threaded end of the tube 1. It is provided with a central shoulder portion $3^a$ and with a downwardly extended threaded portion $3^b$, this plug member 3 is mounted in a hole in the base member 9 of the water heater. The base member 9 is provided with a gasket $9^a$ positioned between the base and water heater portion as shown best in Figs. 1 and 2 of the drawings, and the shoulder $3^a$ rests upon the gasket, the plug 3 being provided with a nut 5 which fits against the lower side of the base, rigidly securing the thermostat in position as shown best in Fig. 1 of the drawings. This plug 3 is provided with a central hole slightly larger than the rod 4 in which the lower end of the rod 4 is slidably mounted. Pivotally connected to the extended end of the rod 4 at its lower end by means of a pivotally connected member 6ª is the lever 6. This lever 6 is pivotally mounted in a slot 7ª in the casing 7, the opposite end of this lever 6 extends inwardly and fits into a slot, on a lug 10ª of the contact support 10 and is adapted to move up and down in the said slot. Secured on the base 9 is a lug 9ᵇ, upon which is pivotally mounted the contact supporting lever 10 and between said lever and the base near the lug 9ᵇ is the compression spring 14 tending to hold the lever 10 so that the contact members are separated. Mounted on the lever member 10 intermediate its ends is an insulation member 11 positioned transversely therewith, and mounted thereon are a pair of contact members 12 by means of bolts 12ª and nuts 12ᵇ. In the opposite side of the casing 7 and positioned on the base 9 is a lug 9ᶜ upon which is pivotally mounted the latch member 15 which is provided with a notch 15ª positioned on an angle as shown and the latch member 15 is provided with long curve and secured in the end is the one end of the spring 16, the opposite end of said spring 16 is supported on the lever 6, thus providing a spring tending to hold the latch toward the end of the lever member 10, it being noted that the latch is thrust outwardly stretching the spring 16 when the thermostat operates the lever 6 in the position shown in Fig. 2 of the drawings, in which case the extended end of the lever 10 engages the notch 15ª, thus securely holding the contacts 12 and 13 in closed position. The end of the lever 6 engaging the free end of the contact supporting lever 10, is provided with a beveled end which engages the edge of the notch 15ª and is adapted to force the latch 15 outwardly about its pivotal axis when the inner end of the lever 6 is forced downwardly. The contacts 13 are stationary contacts rigidly secured in position on the base 9. The contacts 12 and 13 are each provided with electrical conductors extending to the heating element and source of electrical energy as desired.

The operation of the apparatus is as follows:

The heated water in the tank heats the thermostatic aluminum tube 1 causing it to expand at great length while the rod 4 being enclosed and the water cannot get at it and spaced by air therefrom and being of different material, does not expand so much, so that the rod is moved longitudinally sliding in the plug 3, causing the lever 6 to move on its pivotal mounting, which causes the outer end of the lever 6 to move upwardly. The inner end of the lever 6 being beveled at its extended end, engages the notch 15ª and the pressure moves the latch 15 backwardly permitting the spring 14 to throw the lever 10 to the position shown in Fig. 1 of the drawings, which separates the contacts 12 and 13 shutting off the circuit and thereby closing off the heat to the heater. When the water in the heater is cooled to a certain extent the tube 1 contracts causing the rod to be extended depressing the lever 6 so that it takes the position shown in Fig. 2 of the drawings, forcing the ends of the lever 10 down into engagement with the notch 15ª in the latch 15 and the spring 16 holds the latch in engagement thus causing the contacts 12 and 13 to be engaged and sets the heat in the heater in operation.

It will be noted that the lever 6 is provided on its outwardly extending end with a handle 6ᵇ which is adapted to operate the switch mechanism separate and apart from the thermostat if desired. This can be done by releasing the nut which supports the swivel member 6ª when the switch mechanism for the heater can be operated independently from the thermostat.

In the modified form of construction shown in Figs. 4 and 5, the thermostat and its connection is of the same construction as that shown in Figs. 1 and 2. The operating lever in this case, however, is pivotally mounted in a casing 17 which takes the place of the casing 7 in the structure shown in Figs. 1 and 2. The stationary contacts are positioned the same as in the Figs. 1 and 2. The movable contacts are supported on the lever 18, the same as the contacts are mounted on the lever 10 in Figs. 1 and 2. The end of the lever 18, however, is provided with a right-angled turn which engages a notch 19ª in the latch member 19, which is in slightly different shape and form from the latch 15 and the lever 20 which is substituted for the lever 6 and is provided with a right-angled turn the end of which engages the main portion of the lever 18. In operation the extended end of the right-angle turn of the lever 18 engages notch 19ª while in releasing the main portion of the lever 20 engages the curved portion of the latch 19, thrusts it backward by releasing the lever 18 from the notch 19ª. Otherwise the construction is the same as that shown in Figs. 1 and 2 of the drawings.

In the modified form shown in Fig. 6 of the drawings, a lever 21, similar to the levers 6 and 20, is mounted on a special bracket 22 secured to the base 9 and extends downwardly and on which the lever 21 may be pivoted on either side of the member 6ª thus providing for reversal of the action.

Though I have shown and described a particular construction, combination and arrangement of parts and portions and certain modifications thereof, I do not wish to be limited to this particular construction, combination and arrangement nor to the modifications, but desire to include in the scope of my invention the construction, combination and arrangement substantially as set forth in the appended claims.

Having thus described my invention what I claim as new and desire to secure by Letters Patent is:

1. In a thermostat apparatus, a tube, a rod mounted centrally in said tube, adjustably secured at its one end in said tube and reciprocally mounted at its opposite end, a lever pivotally connected to said rod at its reciprocal end, a casing upon which said lever is pivotally mounted, a pivotally mounted contact support, a contact secured thereto intermediate its ends, a stationary contact positioned to be engaged by said first contact, and a latch separate from said lever for engaging said contact support and adapted to be operated by said lever.

2. In a thermostat apparatus, a tube, a rod mounted centrally in said tube, adjustably secured at its one end in said tube and reciprocally mounted at its opposite end, a lever pivotally connected to said rod at its reciprocal end, a casing upon which said lever is pivotally mounted, a pivotally mounted contact support, a contact secured thereto intermediate its ends, a stationary contact positioned to be engaged by said first contact, a latch separate from said lever for engaging said contact support and for positively holding the same with its contact in engagement with the second contact and adapted to be operated by said lever, and resilient means for operating said latch and said contact support.

3. In a thermostat apparatus, a reciprocally mounted rod, a lever pivotally connected to said rod, a casing upon which said lever is pivotally mounted, a pivotally mounted contact support, a contact secured thereto intermediate its ends, a stationary contact positioned to be engaged by said first contact, and a latch separate from said lever for engaging said contact support adapted to be operated by said lever.

4. In a thermostat apparatus, a movable thermostat member, a lever pivotally connected to said thermostat member, a casing upon which said lever is pivotally mounted, a pivotally mounted contact support, a contact secured thereto intermediate its ends, a stationary contact positioned to be engaged by said first contact, a latch separate from said lever for engaging said contact support and adapted to be operated by said lever, and resilient means connecting said lever with said latch.

5. In a thermostat controlled switch means, a switch having separable contacts, a latch for holding said contacts in engagement, a pivotal lever, and a thermostat for controlling said lever, said lever being connected with said latch for releasing the same and the contacts of said switch, said lever being also connected with said switch for forcing the contacts thereof into engagement by the control of said thermostat.

6. In a thermostat controlled switch means, a switch having separable contacts, a latch for holding said contacts in engagement, a pivotal lever, and a thermostat for controlling said lever, said lever being connected with said latch for releasing the same and the contacts of said switch, said lever being also connected with said switch for forcing the contacts thereof into engagement by the control of said thermostat, said latch being so mounted as to latch the contacts of said switch into engagement when the same are shifted into engagement by said lever.

7. In a thermostat controlled switch means, a pair of contacts, a contact supporting member for shiftably supporting one of said contacts, spring means normally separating said contacts, a latch engaging said contact supporting member for normally holding said contacts in engagement against the action of said spring, a pivotal lever, and a thermostat connected with the one end of said lever, the other end of said lever being adapted to engage and to release said latch when shifted in one direction and adapted to shift said contact supporting member with its contact into engagement with the other contact of the switch and to release said latch for holding said supporting member in contact engaging position when said lever is shifted in the opposite direction.

8. In a thermostat controlled switch means, a pair of contacts, a contact supporting member for shiftably supporting one of said contacts, spring means normally separating said contacts, a latch engaging said contact supporting member for normally holding said contacts in engagement against the action of said spring, a pivotal lever, a thermostat connected with the one end of said lever, the other end of said lever being adapted to engage and to release said latch when shifted in one direction and adapted to shift said contact supporting member with its contact into engagement with the other contact of the switch and to release said latch for holding said supporting member in contact engaging position when said lever is shifted in the opposite direction, and a spring connecting said lever and said latch for normally holding the latter in operative position.

9. In a mechanism of the class described, a pair of contacts, a contact supporting member for shiftably supporting one of said contacts, spring means normally separating said contacts, a latch engaging said contact supporting member for normally holding said contacts in engagement against the action of said spring, a pivotal lever, one end of said lever being adapted to engage and to release said latch when shifted in one direction and adapted to shift said contact supporting member with its contact into engagement with the other contact of the switch and to release said latch for holding said supporting member in contact engaging position when said lever is shifted in the opposite direction.

In testimony whereof I have hereunto set my hand at Los Angeles, California, this 3rd day of October, 1925.

EMIL HOWE.